(12) United States Patent
Li et al.

(10) Patent No.: US 7,986,982 B2
(45) Date of Patent: Jul. 26, 2011

(54) HANDSET DEVICE

(75) Inventors: Ping Li, Shenzhen (CN); Yan-Xi Yang, Shenzhen (CN); Da Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 502 days.

(21) Appl. No.: 12/185,119

(22) Filed: Aug. 4, 2008

(65) Prior Publication Data
US 2009/0291722 A1 Nov. 26, 2009

(30) Foreign Application Priority Data
May 22, 2008 (CN) .......................... 2008 1 0301722

(51) Int. Cl.
H04M 1/00 (2006.01)
H04M 5/00 (2006.01)
H04M 9/00 (2006.01)
H05K 5/00 (2006.01)
H05K 7/00 (2006.01)
G06F 1/16 (2006.01)

(52) U.S. Cl. ............... 455/575.1; 455/575.3; 455/575.4; 455/575.8; 379/330; 379/428.01; 379/433.01; 379/433.08; 361/679.02

(58) Field of Classification Search ............... 455/575.1, 455/575.3, 575.4, 575.8, 550.1; 379/330, 379/428.01, 428.04, 433.01, 433.08, 433.11, 379/433.12, 433.13, 437; 361/679.02, 679.09, 361/679.3

See application file for complete search history.

(56) References Cited

U.S. PATENT DOCUMENTS

| 6,463,263 | B1* | 10/2002 | Feilner et al. | 455/90.1 |
| 6,563,927 | B2* | 5/2003 | Mote et al. | 379/433.11 |
| 7,309,253 | B2 | 12/2007 | Ge et al. | |
| 7,412,268 | B2* | 8/2008 | Jung | 455/575.1 |
| 7,702,372 | B2* | 4/2010 | Tu et al. | 455/575.1 |
| 2007/0270194 | A1* | 11/2007 | Park | 455/575.1 |

FOREIGN PATENT DOCUMENTS

| CN | 1825665 A | 8/2006 |
| JP | P2005-259457 A | 9/2005 |

* cited by examiner

Primary Examiner — George Eng
Assistant Examiner — Wesley L Kim
(74) Attorney, Agent, or Firm — Frank R. Niranjan

(57) ABSTRACT

A handset device (10) includes a housing (20) and a battery cover (30) mounted on the housing. The housing includes a front wall (24), a rear wall (22), two sidewalls (26), and at least one bay cooperatively surrounded by the front wall, the rear wall, and the sidewalls. The front wall includes at least one first receiving portion (240) including a wedge-shaped first slidable groove (242) having a first inclination angle and a recessed portion (244) communicating with the first slidable groove. The rear wall includes at least one receiving groove (220). The battery cover includes at least one fastening protrusion (34) corresponding to the first receiving portion and at least one protrusion (32) received in the receiving groove. The fastening protrusion has an inclination angle equal to the first inclination angle and includes a hook located at an end thereof, abutting the recessed portion.

6 Claims, 5 Drawing Sheets

HANDSET DEVICE

BACKGROUND

1. Field of the Invention

The invention relates to handset devices, and particularly to a handset device with a battery cover.

2. Description of Related Art

Batteries are widely used in portable electronic devices such as personal digital assistants (PDAs) and mobile phones. A battery is removably mounted in a housing of the electronic device. A battery cover is mounted on the housing to protect the battery. When the battery is damaged, dead, or needs to be recharged, the battery cover is removed from the housing so that the battery can be taken out and later replaced.

Typically, a fixing mechanism couples a battery cover with a housing of the portable electronic device. Referring to FIGS. 4 and 5, a conventional fixing mechanism for mounting a battery cover 50 on a housing 60 is shown. The fixing mechanism includes a blocking mechanism, an opening 56, a latching mechanism, a pair of slots 62, and a cutout 64. The battery cover 50 forms the blocking mechanism comprising two rearward claws 52, two central claws 54 and two front claws 58, and defines the opening 56. The housing 60 defines the slots 62 and the cutout 64. The latching mechanism includes a block 40, a pair of springs 42, a slider 44 having a blocking part, and a holder 46 fixed to the housing 50. The slider 44 is slidably attached on the holder 46. The block 40 is fixed on the slider 44 and extends through the cutout 54 and the opening 56. The blocking mechanism of the cover 50 engages in the slots 62 of the housing 60 and with the blocking part of the slider 44. Two ends of each spring 42 are attached to the holder 46 and the slider 44, respectively. The engagement between the battery cover 50 and the housing 60 is secure. However, the configuration of the fixing mechanism is very complex and costly, thereby increasing the overall cost of the portable electronic device.

Therefore, a heretofore unaddressed need exists in the industry to overcome the described limitations.

SUMMARY

In an exemplary embodiment, a handset device includes a housing and battery cover mounted on the housing. The housing includes a front wall, a rear wall, a pair of sidewalls, and at least one bay for accommodating a battery. The front wall, the rear wall and the sidewalls cooperatively surround the bay. The front wall includes at least one first receiving portion including a wedge-shaped first slidable groove, which has a first inclination angle, and a recessed portion communicating with the first slidable groove. The rear wall includes at least one receiving groove. The battery cover includes at least one fastening protrusion corresponding to the first receiving portion and at least one protrusion received in the receiving groove. The at least one fastening protrusion has an inclination angle equal to the first inclination angle and includes a hook located on an end thereof, abutting the recessed portion.

Other advantages and novel features will become more apparent from the following detailed description of preferred embodiments when taken in conjunction with the accompanying drawings.

DETAILED DESCRIPTION OF THE EMBODIMENTS

Figure 1:
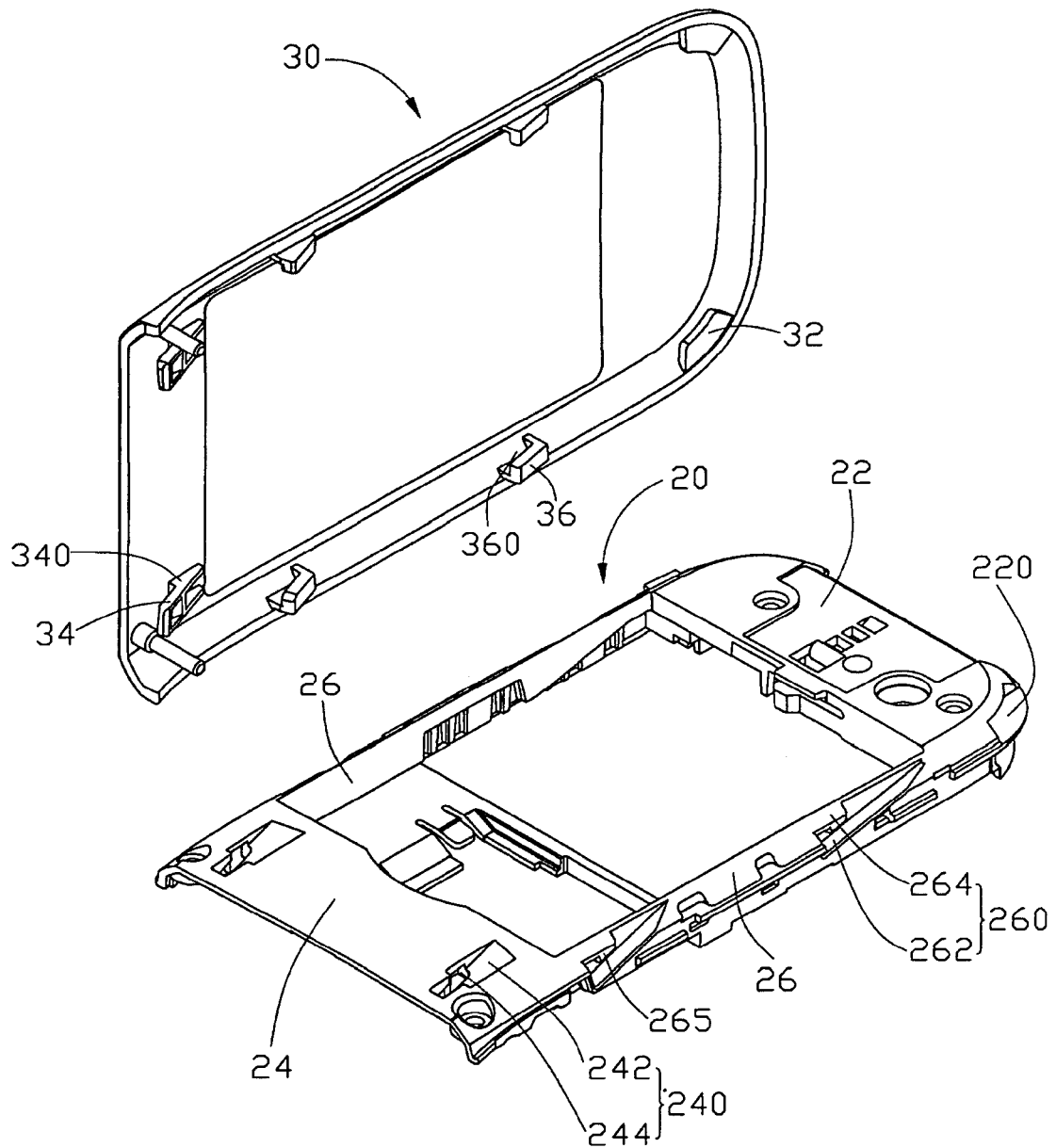
FIG. 1 is an exploded isometric view of a handset device of an exemplary embodiment of the present invention.

FIG. 1 is an exploded, isometric view of a handset device 10 of an exemplary embodiment of the present invention. The handset device 10 comprises a housing 20 and a battery cover 30 mounted on the housing 20. In the embodiment, the handset device 10 is a portable electronic device such as a mobile phone, a personal digital assistant (PDA), or other. The handset device 10 has a curved shape.

The housing 20 typically accommodates electronic elements such as printed circuit boards (PCBs), batteries, electronic cards, etc. The housing 10 is generally a frame and comprises a rear wall 22, a front wall 24, and a pair of opposite sidewalls 26. The rear wall 22, the front wall 24, and the sidewalls 26 are mechanically connected, and collectively surround several bays accommodating the electronic elements. In the embodiment, the housing 10 comprises two bays, one accommodating a battery and the other accommodating a subscriber identity module (SIM) card.

In other embodiments, the rear wall 22, the front wall 24, and the sidewalls 26 can be formed together from a single piece with the housing 20 comprising a bay accommodating a battery.

The rear wall 22 comprises a pair of receiving grooves 220 positioned at opposite distal ends thereof. The receiving grooves 220 are symmetrical about a longitudinal central line of the housing 20.

The front wall 24 comprises a pair of first receiving portions 240 positioned at two ends thereof, each adjacent to the sidewall 26. The first receiving portions 240 are symmetrical about the longitudinal central line of the housing 20. Each of the first receiving portions 240 comprises a first slidable groove 242 and a recessed portion 244 communicating with the first slidable groove 242. A bottom of the first slidable groove 242 is angled, such that the first slidable groove 242 is a wedge-shaped groove having a first inclination angle.

Each of the sidewalls 26 comprises a pair of second receiving portions 260 spaced apart from each other and adjacent to the front wall 24 or the rear wall 22. Each of the second receiving portions 260 comprises a second slidable groove 262 and a fixing portion 264 positioned over the second slidable groove 262. A bottom of the second slidable groove 262 is angled, such that the second slidable groove 262 is a wedge-shaped groove having a second inclination angle. The fixing portion 264 comprises a first hook 265 located at an end thereof.

In the embodiment, the first inclination angle of the first slidable groove 242 exceeds the second inclination angle of the second slidable groove 262. The receiving groove 220, the first slidable grooves 242 and the second slidable grooves are designated as grooves.

In other embodiments, each of the sidewalls 26 can only comprise a second receiving portion 260 located at a middle thereof. The front wall 24 can only comprise a first receiving portion 240 located in the middle thereof.

The battery cover 30 is slidably mounted on the housing 20 covering the bays of the housing 20. The battery cover 30 comprises a pair of protrusions 32 corresponding to the receiving grooves 220, a pair of fastening protrusions 34, each having a third inclination angle and corresponding to the first receiving portion 240, and two pairs of L-shaped locking protrusions 36, each having a fourth inclination angle and corresponding to the second receiving portion 260. Each of the protrusions 32 protrudes from the inner surface of a rear end of the battery cover 30. Each of the protrusions 32 is received in the corresponding receiving groove 220 to limit movement of the battery cover 30 longitudinally, horizontally, and vertically.

In the embodiment, the protrusions 32, the fastening protrusions 34, and the locking protrusions 36 are designated as protrusions.

The locking protrusions 36 are symmetrical about a longitudinal central line of the battery cover 20. The locking protrusions 36 each extend from the inner surface of two opposite sides of the battery cover 30 towards the housing 20. Each of the locking protrusions 36 and the inner surface of the battery cover 20 cooperatively surround a bay 360. The fourth inclination angle of the locking protrusions 36 is generally equal to the second inclination angle of the second slidable groove 262. In the embodiment, the locking protrusions 36 are received in the second slidable grooves 262, respectively, and the first hooks 265 of the fixing protrusions abut a bottom of the bay 360, respectively, to limit the movements of the battery cover 30 longitudinally, horizontally, and vertically.

The fastening protrusions 34 are symmetrical about the longitudinal central line of the battery cover 20. Each of the fastening protrusions 34 extends from the inner surface of a front end of the battery cover 30 towards the housing 20. An extending direction of each fastening protrusion 34 is the same as that of each locking protrusion 36. The third inclination angle of the fastening protrusion 34 is generally equal to the first inclination angle of the first slidable groove 242. Each of the fastening protrusions 34 comprises a second hook 340 located at an end thereof. In the embodiment, the fastening protrusions 34 are received in the corresponding first slidable groove 242 with the second hooks 340 abutting the recessed portion 244, respectively, to limit the movements of the battery cover 30 longitudinally, horizontally, and vertically.

In other embodiments, the battery cover 30 can only comprise a pair of locking protrusions each protruding from the inner surface of the side thereof towards the housing 20 and located in a middle of the side. The battery cover 30 can only comprise a fastening protrusion 34 protruding from the inner surface of the front end thereof towards the housing 20.

Figure 2:
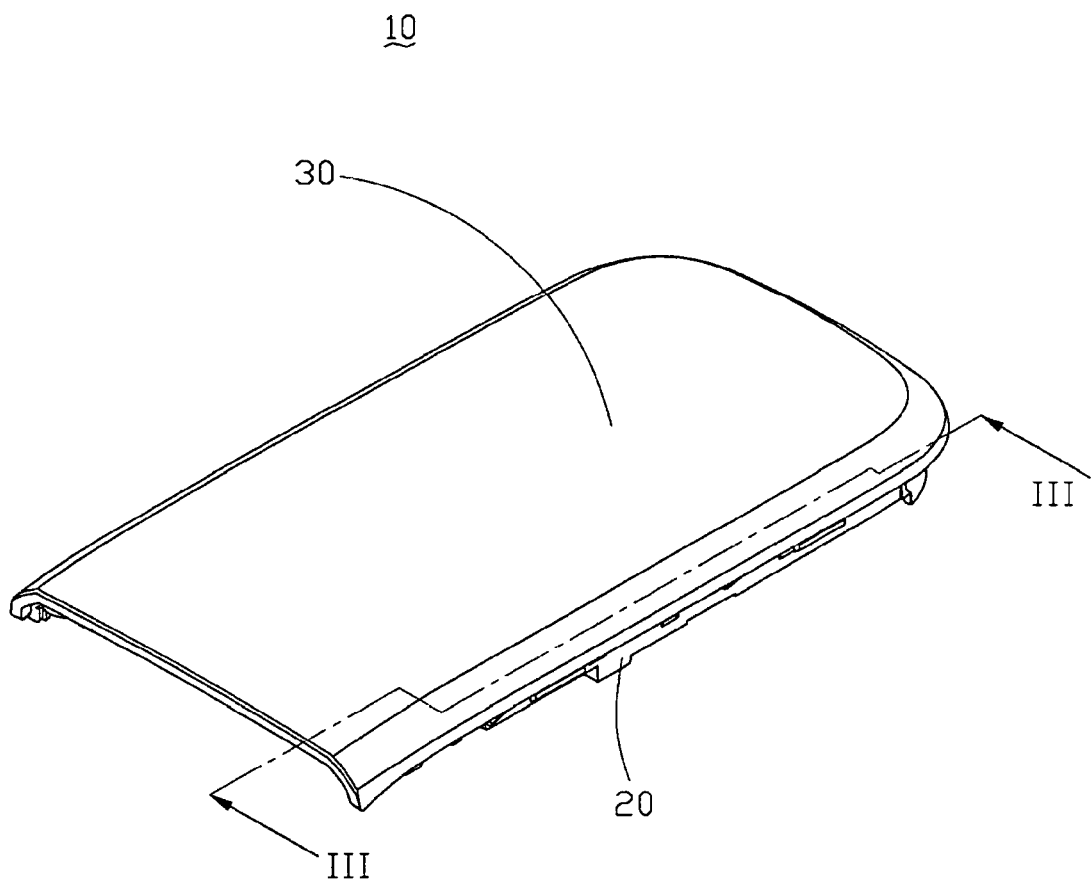
FIG. 2 is an assembled view of the handset device of FIG. 1.
Figure 3:
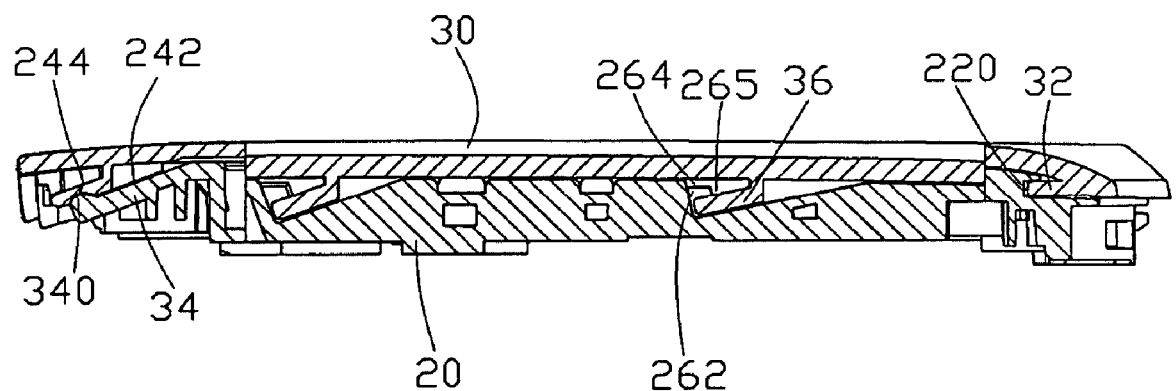
FIG. 3 is an sectional view taken along line III-III of FIG. 2.

Referring to FIGS. 2 and 3, in assembly, the protrusions 32 of the battery cover 30 are received in the corresponding receiving grooves 220 of the housing 20, respectively, the fastening protrusions 34 of the battery cover 30 are received in the first slidable grooves 242 of the housing 20, respectively, and the locking protrusions 36 of the battery cover 30 are received in the second slidable grooves 262 of the housing 20, respectively. Subsequently, the battery cover 30 is moved in a first direction parallel to the longitudinal direction with the locking protrusions 36 sliding in the second slidable grooves 262 and the fastening protrusions 34 sliding in the first slidable grooves 242 until the protrusions 32 are completely received in the corresponding receiving grooves 220 of the housing 20, respectively, the second hooks 265 of the housing 20 abut the bottom of the bays 360 of the battery cover 30, respectively, and the second hooks 340 of the battery cover 30 abut the recessed portions 244 of the housing 20, respectively. The battery cover 30 is mounted on the housing 20.

When the battery in the bay of the housing 20 is to be removed, the battery cover 30 is moved in a second direction opposite to the first direction with the protrusions 32 being detached from the receiving grooves 220, respectively, the locking protrusions 36 being detached from the second receiving portions 260, respectively, and the fastening portions 34 being detached from the first receiving portions 240, respectively. As a result, the battery cover 30 can easily be disassembled from the housing 20.

Figure 4:
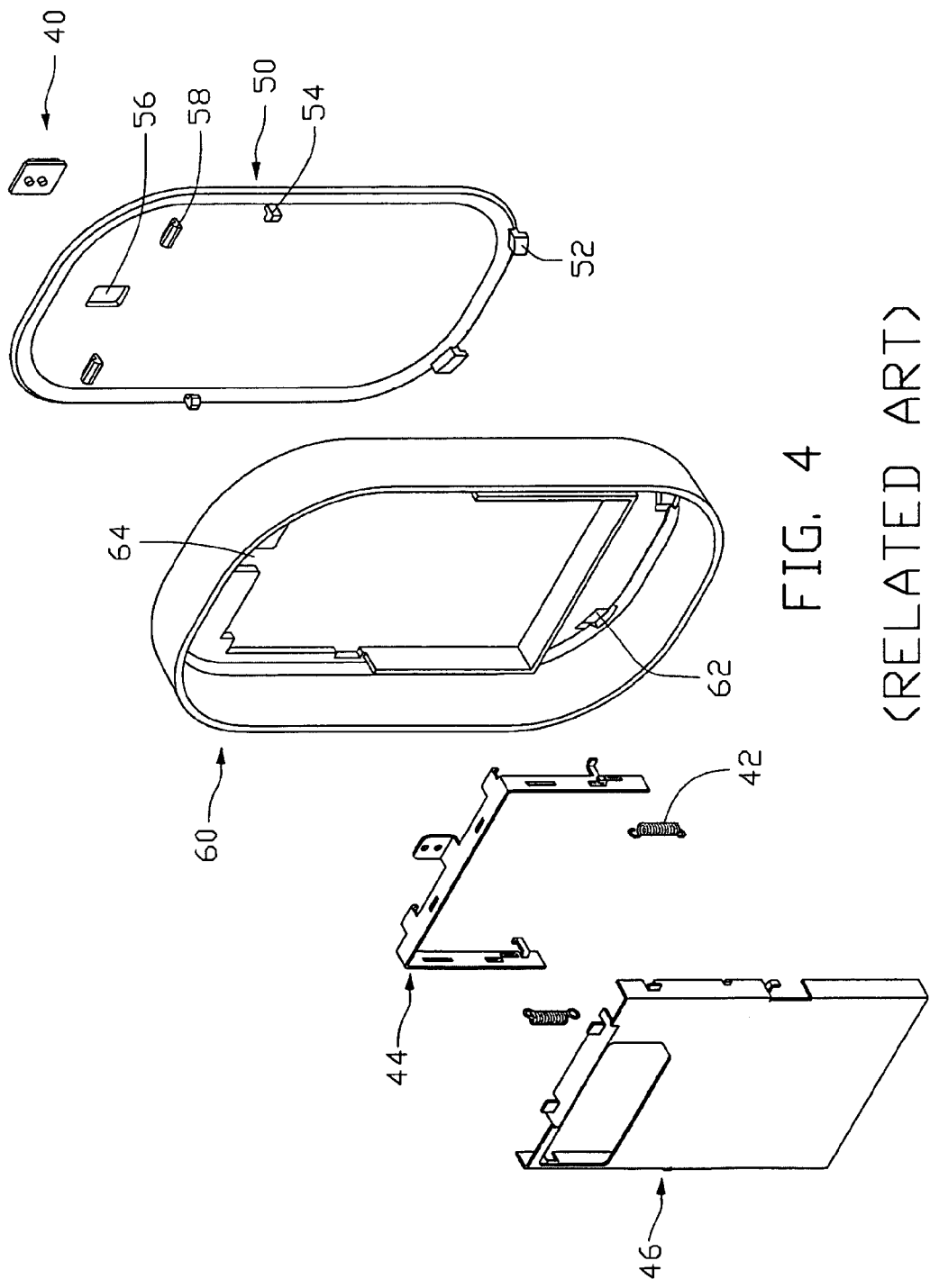
FIG. 4 is an exploded, isometric view of a conventional handset device.
Figure 5:
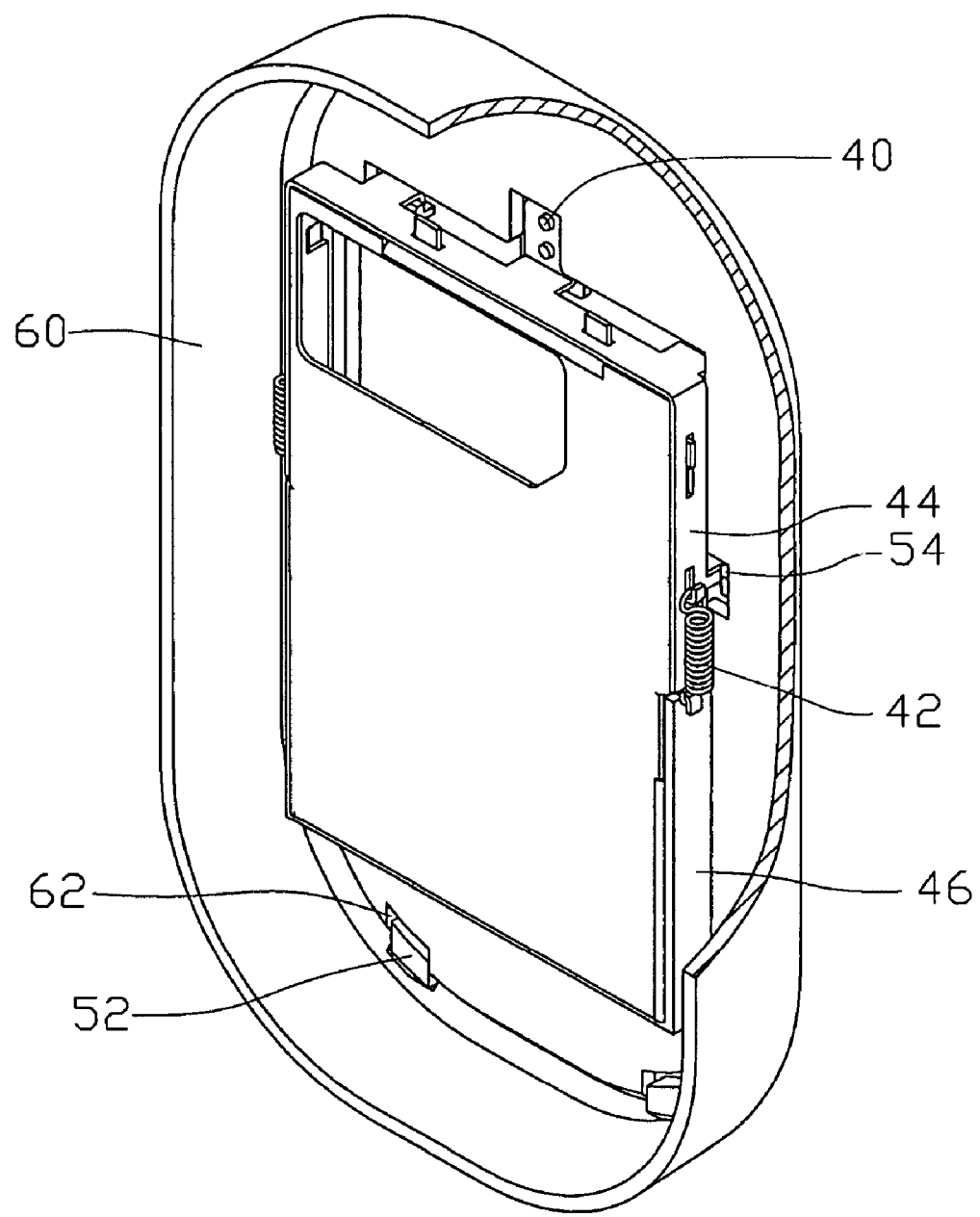
FIG. 5 is an assembled, cut-away view of the handset device of FIG. 4.

The protrusions of the battery cover 30 and the grooves of the housing 20 function the same as the fixing mechanism of FIG. 4. Compared to the fixing mechanism of FIG. 4, the configuration of the protrusions and the grooves of the present invention is simpler and more cost effective.

While embodiments of the present invention have been described above, it should be understood that they have been presented by way of example only and not by way of limitation. Thus, the breadth and scope of the present invention should not be limited by the above-described exemplary embodiments, but should be defined only in accordance with the following claims and their equivalents.

What is claimed is:

1. A handset device comprising:
a housing accommodating electronic elements, the housing comprising a front wall, a rear wall, and a pair of sidewalls, the front wall comprising at least one first receiving portion comprising a wedge-shaped first slidable groove having a first inclination angle and a recessed portion communicating with the first slidable groove, each of the sidewalls comprising at least one second receiving portion comprising a wedge-shaped second slidable groove having a second inclination angle and a fixing portion positioned over the second slidable groove, with the first inclination angle exceeding the second inclination angle; and
a battery cover mounted on the housing, the battery cover comprising at least one fastening protrusion corresponding to the first receiving portion and at least one pair of locking protrusions corresponding to the second receiving portions, the at least one fastening protrusion having a third inclination angle equal to the first inclination angle and comprising a hook located an end thereof, each of the locking protrusions having a fourth inclination angle equal to the second inclination angle;
wherein the hook of the fastening protrusion abuts the recessed portion, and the fixing portions abut the locking protrusions, respectively.

2. The handset device as claimed in claim 1, wherein each of the locking protrusions has an L-shaped profile.

3. The handset device as claimed in claim 2, wherein a bay is formed between an inner surface of the battery cover and each of the locking protrusions, and each of the fixing portions comprises a hook abutting the bay to fix the locking protrusion.

4. The handset device as claimed in claim 1, wherein the housing further comprises at least one receiving groove located at the rear wall, and the battery cover comprises at least one protrusion received in the receiving groove.

5. The handset device as claimed in claim 1, wherein each of the locking protrusions extends from the inner surface towards the housing, and the fastening protrusion extends from the inner surface towards the housing.

6. The handset device as claimed in claim 5, wherein an extending direction of the locking protrusion is the same as that of the fastening protrusion.

* * * * *